United States Patent
Asai et al.

(10) Patent No.: US 7,999,052 B2
(45) Date of Patent: Aug. 16, 2011

(54) PROCESS FOR PRODUCING AN ADHESIVE COMPOSITION

(75) Inventors: Takahiro Asai, Kawasaki (JP); Koichi Misumi, Kawasaki (JP); Atsushi Miyanari, Kawasaki (JP); Yoshihiro Inao, Kawasaki (JP); Akihiko Nakamura, Kawasaki (JP); Koji Saito, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 337 days.

(21) Appl. No.: 12/377,473

(22) PCT Filed: Aug. 1, 2007

(86) PCT No.: PCT/JP2007/065060
§ 371 (c)(1),
(2), (4) Date: Feb. 13, 2009

(87) PCT Pub. No.: WO2008/029569
PCT Pub. Date: Mar. 13, 2008

(65) Prior Publication Data
US 2010/0227996 A1  Sep. 9, 2010

(30) Foreign Application Priority Data
Sep. 7, 2006  (JP) .................................. 2006-243452

(51) Int. Cl.
*C08F 220/10* (2006.01)
(52) U.S. Cl. .................. 526/329.2; 428/473.5; 524/548; 524/555
(58) Field of Classification Search ............... 526/329.2; 428/473.5; 524/548, 555
See application file for complete search history.

(56) References Cited

U.S. PATENT DOCUMENTS

| 6,337,288 | B1 | 1/2002 | Ohya et al. | |
| 6,432,475 | B1 * | 8/2002 | Yamamoto et al. | ........ 427/208.4 |
| 7,268,061 | B2 | 9/2007 | Miyanari et al. | |
| 2002/0127821 | A1 | 9/2002 | Ohya et al. | |
| 2005/0170612 | A1 | 8/2005 | Miyanari et al. | |

FOREIGN PATENT DOCUMENTS

| CA | 2291808 | | 6/2000 |
| EP | 1 008 640 | | 6/2000 |
| JP | 61-158145 | | 7/1986 |
| JP | 2-3483 | | 1/1990 |
| JP | 02003483 A | * | 1/1990 |
| JP | 10-251609 | | 9/1998 |
| JP | 2001-279208 | | 10/2001 |
| JP | 2003-173993 | | 6/2003 |
| JP | 2003-292931 | | 10/2003 |
| JP | 2003-313518 | | 11/2003 |

OTHER PUBLICATIONS

International Search Report for PCT/JP2007/065060, mailed Aug. 28, 2007.

* cited by examiner

*Primary Examiner* — Michael M Bernshteyn
(74) *Attorney, Agent, or Firm* — Nixon & Vanderhye PC

(57) ABSTRACT

An adhesive composition according to the present invention is an adhesive composition whose main component is a polymer obtained by copolymerization of a monomer composition, which monomer composition contains styrene, (meth) acrylic ester having a cyclic structure, and alkyl (meth) acrylate having a chain structure. The polymer thus having a styrene block segment allows improvement of thermal resistance, adhesive strength in a high temperature environment, alkaline resistance, and easiness in stripping following a high temperature process of the adhesive composition. As such, an adhesive composition is provided, which has high thermal resistance, adhesive strength in the high temperature environment, and alkaline resistance, and further which can easily carry out stripping of the adhesive composition after a high temperature process has been carried out to the adhesive composition.

1 Claim, 2 Drawing Sheets

PROCESS FOR PRODUCING AN ADHESIVE COMPOSITION

This application is the U.S. national phase of International Application No. PCT/JP2007/065060, filed 1 Aug. 2007, which designated the U.S. and claims priority to Japan Application No. 2006-243452, filed 7 Sep. 2006, the entire contents of each of which are hereby incorporated by reference.

TECHNICAL FIELD

The present invention relates to an adhesive composition, a film adhesive, and a process for production of the composition. More specifically, the present invention relates to an adhesive composition, a film adhesive, and a process for production of the composition, each of which for temporally fixing a sheet or a protection board on a semiconductor product, in a step of carrying out processing such as grinding of semiconductor products (e.g., semiconductor wafer), optical products, and the like.

BACKGROUND ART

In recent years, due to multiple functioning of mobile phones, digital AV devices, IC cards, and the like, demands have been increasing for downsizing, reduction in thickness, and high integration of semiconductor silicon chips (hereinafter referred to as "chips"). For example, the reduction of thickness is demanded for integrated circuits which integrate a plurality of chips, as typified by CSP (chip size package) and MCP (multi-chip package). Among these integrated circuits, a system-in-package (SiP) in which a plurality of semiconductor chips are mounted in a single semiconductor package has become an extremely important technique in order to accomplish downsizing, reduction in thickness, and high integration of chips that are installed in the semiconductor package. The downsizing, reduction in thickness and high integration enables realization of multiple functioning, downsizing, and reduction of weight of electronic devices.

In order to respond to such needs for a thin product, it is required to reduce the thickness of a chip to not more than 150 μm. Further, it is required to process the chip so that its thickness is reduced to not more than 100 μm for the CSP and the MCP, and not more than 50 μm for the IC cards.

Conventionally, SiP products are manufactured by use of a method in which respective bumps (electrodes) provided on each of stacked chips are wired to a circuit board by a wire bonding technique. In order to respond to the demand for the reduction in thickness and high integration, a through-hole electrode technique is required, not the wire bonding technique. The through-hole electrode technique is a technique in which (i) chips each having a through-hole electrode are stacked and (ii) a bump is formed on a back side of the chips thus stacked.

A thin chip is manufactured by, for example, in a method as follows: (i) a high purity single crystal silicon or the like is sliced to a wafer form, (ii) a predetermined circuit pattern of an IC or the like is formed on a surface of the wafer by etching the surface of the wafer so that an integrated circuit is built, (iii) a back surface of the semiconductor wafer thus obtained is grinded by use of a grinder, and (iv) after the semiconductor wafer is grinded to a predetermined thickness, the semiconductor wafer is diced so as to form a chip shape. At this time, the predetermined thickness is around a range of 100 μm to 600 μm. Further, in a case where a through-hole electrode is to be formed, the wafer is grinded to a thickness of around a range of 50 μm to 100 μm.

In the manufacture of the semiconductor chip, the semiconductor wafer readily breaks in a case where external force is given to the wafer in the grinding step or at the time when the wafer is carried to the dicing step. This is because the semiconductor wafer is thin and fragile, and because circuit patterns are unlevel. Moreover, in the grinding step, purified water is used to clean the back surface of the semiconductor wafer for removing grinding dust and heat generated at the time of grinding, while grinding process is carried out. At this time, there is a need to prevent contamination of the circuit pattern surface due to the purified water used in the cleaning.

Accordingly, in order to protect the circuit pattern surface of the semiconductor wafer and prevent breakage of the semiconductor wafer, a film adhesive for processing is attached on the pattern circuit pattern surface while the grinding process is carried out.

Moreover, at the time of the dicing, the semiconductor wafer is diced in a state in which a protection sheet is attached to a back surface of the semiconductor wafer so that the semiconductor wafer is fixed. Chips obtained by the dicing are pushed up by use of a needle from a film base material side, and are fixed on a die pad.

Known types of film adhesives for processing and protection sheets as such include, for example, ones in which an adhesive layer made of an adhesive composition is provided on a base material film such as polyethylene terephthalate (PET), polyethylene (PE), polypropylene (PP), or ethylene-vinyl acetate copolymer (EVA) (for example, Patent Document 1, Patent Document 2, and Patent Document 3).

An arrangement has also been disclosed (Patent Document 4) in which a protection board is used instead of using the film adhesive for processing or the protection sheet. The protection board is an aluminum nitride-boron nitride pore sintered body impregnated with ladder-type silicone oligomer. In the arrangement, this protection board and the semiconductor wafer are adhered together by use of a thermoplastic film. There is also a method in which material such as alumina, aluminum nitride, boron nitride, or silicon carbide, each of which have substantially a same thermal expansivity as the semiconductor wafer, is used as the protection board, and thermoplastic resin such as polyimide is used as an adhesive for attaching the protection board and the semiconductor wafer (Patent Document 5). This method suggests applying the adhesive in a form of a film having a thickness in a range of 10 μm to 100 μm. As a method for forming the film, the method of Patent Document 5 suggests that an adhesive composition is applied by spin coating and dried, so that an obtained film has a thickness of not more than 20 μm.

Moreover, due to the multilayer interconnection of semiconductor elements, a process is conducted such that: (i) a protection board is adhered to, by use of the adhesive composition, to a surface of the semiconductor wafer on which a circuit is formed; (ii) a back surface of the semiconductor wafer is polished; (iii) the back surface thus polished is etched to form a mirror plane; and (iv) a back surface circuit is formed on the mirror plane. In this case, the protection board is adhered to the semiconductor wafer until the back surface circuit is formed (Patent Document 6).

[Patent Document 1]
Japanese Unexamined Patent Publication No. 173993/2003 (Tokukai 2003-173993; published on Jun. 20, 2003)

[Patent Document 2]
Japanese Unexamined Patent Publication No. 279208/2001 (Tokukai 2001-279208; published on Oct. 10, 2001)

[Patent Document 3]
Japanese Unexamined Patent Publication No. 292931/2003 (Tokukai 2003-292931; published on Oct. 15, 2003)

[Patent Document 4]
Japanese Unexamined Patent Publication No. 203821/2002 (Tokukai 2002-203821; published on Jul. 19, 2002)
[Patent Document 5]
Japanese Unexamined Patent Publication No. 77304/2001 (Tokukai 2001-77304; published on Mar. 23, 2001)
[Patent Document 6]
Japanese Unexamined Patent Publication No. 158145/1986 (Tokukaisho 61-158145; published on Jul. 17, 1986)

DISCLOSURE OF INVENTION

However, the following problems occur in a case where the conventional film adhesive for processing and the like are used in steps which require high temperature processing and high vacuum processing as like in formation of the through-hole electrode: a problem of poor adhesion caused by insufficient adhesive strength in a high temperature environment or generation of gas in a high vacuum environment; or a problem of poor stripping such as residue remaining at the time of stripping following a high temperature process.

For example, in the formation of the through-hole electrode, when semiconductor chips are connected to each other after formation of a bump on each of the semiconductor chips, a process is required which applies heat to the semiconductor chips to approximately 200° C., and further has the semiconductor chips to be in a high vacuum state. However, the adhesive composition which constructs the adhesive layer of a protection tape according to Patent Documents 1 and 2 has no resistance against such a high temperature of 200° C. Moreover, gas is generated due to application of heat. This gas causes the poor adhesion.

The thin semiconductor wafer requires to be stripped off from the protection board after the grinding and dicing. However, the adhesive composition which constructs the adhesive layer of a protection tape disclosed in Patent Document 3 is an epoxy resin composition. At a high temperature of 200° C., the epoxy resin changes in quality and cures. This causes residue to remain at the time of stripping, thereby causing poor stripping.

Further, in the thermoplastic film used for adhering the protection board and the semiconductor wafer in Patent Documents 4 and 5, gas derived from absorbed moisture is generated. This causes the problem of poor adhesion. The processing method of the semiconductor substrate according to Patent Document 6 carries out a mirror surfacing process by use of an etching liquid and formation of a metal film due to vacuum plating. In order to carry out these processes, the adhesive composition for adhering the protection board and the semiconductor wafer requires thermal resistance and stripping property. However, Patent Document 6 includes no disclosure regarding formation of the adhesive composition.

A study conducted by inventors of the present invention resulted in that, in processings of a semiconductor wafer and a chip, an adhesive which uses acrylic resin material is preferably used, due to its crack resistance. However, the inventors found that the following problems occur even when the adhesive which uses such acrylic resin material is used:

(1) Adhesive strength is weak in a high temperature environment, due to an occurrence of a bubble-form strip on an adhesive surface at the time when the adhesive layer and the protection board are thermally compressed together, caused by generation of gas from moisture absorbed by the adhesive layer. Such generation of gas causes problems, not only that the adhesive strength is weakened in the high temperature environment, but also difficulty in production and maintenance of a vacuum environment in a case where processing is carried out under vacuum conditions.

(2) In a case where there is a step at which the semiconductor wafer has contact with an alkaline liquid such as an alkaline slurry or an alkaline developer, a contact surface of the adhesive composition deteriorates due to stripping, melting, diffusion or the like caused by the alkaline liquid.

(3) In a case where the adhesive is heated to approximately 200° C., the adhesive composition changes in quality due to low thermal resistance. This causes poor stripping such as formation of insoluble substance in a stripping solution.

The present invention is attained in view of the problems, and an object thereof is to provide an adhesive composition which has (i) high adhesive strength in a high temperature environment, particularly at a temperature in a range of 140° C. to 200° C., (ii) high thermal resistance, and (iii) high alkaline resistance, and which further can be easily stripped off from a semiconductor wafer, a chip, and the like, even after the adhesive composition has been subjected to processings carried out in a high temperature and/or vacuum environment (hereinafter simply referred to as "high temperature process").

A first mode according to the present invention is an adhesive composition whose main component is a polymer obtained by copolymerizing a monomer composition, the monomer composition containing styrene, a (meth)acrylic acid ester having a cyclic structure, and an alkyl (meth)acrylate having a chain structure, the polymer having a styrene block segment.

A second mode of the present invention is a film adhesive including: a film; and an adhesive layer provided on the film, containing the adhesive composition.

A third mode of the present invention is a process of producing an adhesive composition whose main component is a polymer obtained by copolymerizing a monomer composition containing styrene, a (meth)acrylic acid ester having a cyclic structure, and an alkyl (meth)acrylate having a chain structure, the process including: introducing the styrene in a range of 5 to 100 parts by mass at once or stepwise, between initiation and termination of the copolymerization, wherein an entire amount of the styrene is 100 parts by mass, and the copolymerization is initiated by mixing the (meth)acrylic acid ester, the alkyl (meth)acrylate, and a remaining part of the styrene.

For a fuller understanding of the nature and advantages of the invention, reference should be made to the ensuing detailed description taken in conjunction with the accompanying drawings.

BEST MODE FOR CARRYING OUT THE INVENTION

Figure 1:
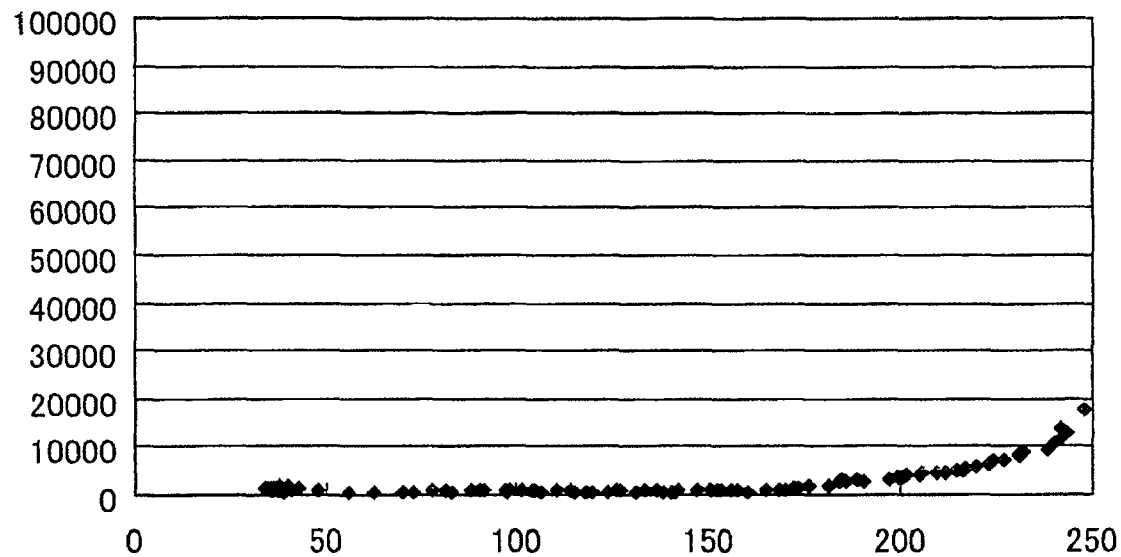
FIG. 1 is an explanatory view showing a result of a TDS measurement of an adhesive composition whose main component is a polymer that has a styrene block segment, in Example of the present invention.

One embodiment of the present invention is as described below.

In the present embodiment, the following technical means is used: an adhesive composition whose main component is a polymer obtained by copolymerizing a monomer composition which contains styrene, a (meth)acrylic acid ester having a cyclic structure, and an alkyl (meth)acrylate having a chain structure, is to be provided with a styrene block segment inside the polymer. The present embodiment also uses technical means of further combining, to the monomer composition, a carboxylic acid having an ethylenic double bond, a bifunctional monomer, and a styrene macromonomer.

The present embodiment describes the foregoing technical means, however an adhesive composition according to the present invention is not limited to the embodiment later described. For example, the technical means later described may be combined as appropriate. Combination of the technical means allows attainment of an adhesive composition having further excellent adhesive strength in a high temperature environment (particularly at a temperature in a range of 140° C. to 200° C.), thermal resistance, alkaline resistance, and easiness in stripping off of the adhesive composition which has been subjected to a high temperature process.

[Material of Monomer and Structure of Polymer that is Main Component of Adhesive Composition]

An adhesive composition according to the present embodiment includes, as its main component, a polymer obtained by copolymerizing a monomer composition, which monomer composition contains styrene, a (meth)acrylic acid ester having a cyclic structure, and an alkyl (meth)acrylate having a chain structure. This structure allows the adhesive composition to have, to a certain degree, thermal resistance, adhesive strength in a high temperature environment, alkaline resistance, and easiness in stripping off of the adhesive composition which has been subjected to a high temperature process.

Additionally, by further including, in the monomer component, a carboxylic acid having an ethylenic double bond, a bifunctional monomer, and a styrene macromonomer later described, and by further having the polymer having a styrene block segment later described, the adhesive strength in the high temperature environment, the thermal resistance and the like further improves.

The "main component" in the present specification denotes that an amount of such component contained is more than any of other components contained in the adhesive composition. The amount of the main component contained is not limited as long as it is the most among all of components that is contained in the adhesive composition. However, the amount of the main component contained is preferably in a range of not less than 50 parts by mass but not more than 100 parts by mass, and is further preferably in a range of not less than 70 parts by mass but not more than 100 parts by mass, where an entire mass of the adhesive composition is 100 parts by mass. The amount of the main component contained not less than 50 parts by mass allows sufficient demonstration of an effect in accordance with the high thermal resistance, high adhesive strength in a high temperature environment, alkaline resistance and easiness in stripping, each of which are properties of the adhesive composition.

(Styrene)

The adhesive composition according to the present embodiment contains styrene in the monomer composition. Properties of the styrene do not change even in a high temperature environment of not less than 200° C. This allows improvement in thermal resistance of the adhesive composition.

A mixed amount of the styrene is not limited as long as copolymerization with other compounds contained in the monomer composition can proceed. However, the mixed amount of the styrene is preferably in a range of 10 to 50 parts by mass, and is further preferably in a range of 20 to 40 parts by mass, where a total amount of the monomer composition that contains the styrene, the (meth)acrylic acid ester, and the alkyl (meth)acrylate is 100 parts by mass. The mixed amount of not less than 10 parts by mass allows further improvement in the thermal resistance, and the mixed amount of not more than 50 parts by mass enables suppression of a decrease in crack resistance.

((Meth)acrylic Acid Ester Having Cyclic Structure)

The adhesive composition according to the present invention contains, in the monomer composition, (meth)acrylic acid ester having a cyclic structure. This improves the thermal resistance of the adhesive composition. Moreover, by containing the (meth)acrylic acid ester, it is possible to reduce a required amount of acrylic acid. This ensures a good stripping property by use of a stripping solution.

A mixed amount of the (meth)acrylic acid ester is not limited as long as copolymerization with other compounds contained in the monomer composition can proceed. However, the mixed amount of the (meth)acrylic acid ester is preferably in a range of 5 to 60 parts by mass, and is further preferably in a range of 10 to 40 parts by mass, where the total amount of the monomer composition that contains the styrene, the (meth)acrylic acid ester, and the alkyl (meth)acrylate is 100 parts by mass. The mixed amount of not less than 5 parts by mass allows further improvement of the thermal resistance, and the mixed amount of not more than 60 parts by mass enables attainment of the good stripping property.

The (meth)acrylic acid ester has a structure in which a hydrogen atom in a carboxyl group of (meth)acrylic acid is replaced with a cyclic group or an organic group that has a cyclic group. The organic group that has the cyclic group is not particularly limited, however is preferably an alkyl group in which one hydrogen atom is replaced with a cyclic group.

The cyclic group may be, for example, an aromatic monocyclic or polycyclic group in which at least one hydrogen atom is removed from benzene, naphthalene, or anthracene, or may be an aliphatic cyclic group. The cyclic group may further have a substituent later described.

Specific examples of the aliphatic cyclic group encompass, for example, groups in which at least one hydrogen atom is removed from monocycloalkane, polycycloalkane, such as dicycloalkane, tricycloalkane, or tetracycloalkane. More specifically, examples encompass groups in which at least one hydrogen atom is removed from monocycloalkanes such as cyclopentane or cyclohexane, or from polycycloalkanes such as adamantane, norbornane, isobornane, tricyclodecane, or tetracyclodecane. Among these groups, the groups in which at least one hydrogen atom is removed from cyclohexane or dicyclopentane are preferable. Moreover, the cyclohexane and the dicyclopentane may further have the substituent later described.

Examples of the substituent are, for example, a hydroxyl group, a carboxyl group, a cyano group, a polar group such as an oxygen atom (=O), or a straight or branched C1 to C4 lower alkyl group. In a case where the cyclic group further has the substituent, it is preferable for the cyclic group to have the polar group, the lower alkyl group, or both the polar group and the lower alkyl group. It is particularly preferable to have the polar group be the oxygen atom (=O).

An alkyl group in the alkyl group in which one hydrogen atom is replaced with a cyclic group is preferably a C1 to C12 alkyl group. The (meth)acrylic acid ester which has such cyclic structure is, for example, cyclohexyl-2-propylacrylate.

Examples of the (meth)acrylic acid ester which has the cyclic structure are, for example, phenoxyethyl acrylate and phenoxy propyl acrylate.

The "aliphatic" in the present specification is a relative concept with respect to aromatic, and is defined as a group, a compound or the like which is not aromatic. For example, an "aliphatic cyclic group" is a monocyclic group or polycyclic group that is not aromatic.

It is also possible to use, as the (meth)acrylic acid ester, a (meth)acrylic acid ester which contains (i) a (meth)acrylic acid ester having a cyclic structure which includes the substituent in the cyclic structure and (ii) a (meth)acrylic acid ester having a cyclic structure without the substituent in the cyclic structure.

Improvement in the thermal resistance and flexibility is attained by simultaneously containing the (meth)acrylic acid ester having a cyclic structure which includes the substituent in the cyclic structure and the (meth)acylic acid ester having a cyclic structure without the substituent in the cyclic structure.

(Alkyl (Meth)acrylate having Chain Structure)

The adhesive composition according to the present invention contains, in the monomer composition, an alkyl (meth) acrylate having a chain structure. This allows improvement in flexibility and crack resistance of an adhesive layer obtained from the adhesive composition.

A mixed amount of the alkyl (meth)acrylate is not limited, as long as copolymerization with other compounds contained in the monomer composition can proceed. However, the mixed amount of the alkyl (meth)acrylate is preferably in a range of 10 to 60 parts by mass, where a total amount of the monomer composition containing thestyrene, the (meth) acrylic acid ester and the alkyl (meth)acrylate is 100 parts by mass. The mixed amount of not less than 10 parts by mass allows improvement in the flexibility and crack resistance of the obtained adhesive layer. The mixed amount of not more than 60 enables suppression in an occurrence of: a decrease in thermal resistance; poor stripping; and moisture absorbency.

In the present specification, the alkyl (meth)acrylate denotes an acrylic long chain alkyl ester having a C15 to C20 alkyl group, and an acrylic alkyl ester having a C1 to C14 alkyl group.

Examples of the acrylic long chain alkyl ester encompass: an alkyl ester of an acrylic or methacrylic acid, which alkyl group is an n-pentadecyl group, an n-hexadecyl group, an n-heptadecyl group, an n-oxtadecyl group, an n-eicosyl group, or the like. Note that the alkyl group may be of a branched state.

Publicly known acrylic alkyl esters that are used in existing acrylic adhesives are examples of the acrylic alkyl esters having the C1 to C14 alkyl group. Examples of these acrylic alkyl esters are, for example, alkyl esters of an acrylic or methacrylic acid, whose alkyl group is a methyl group, an ethyl group, a propyl group, a butyl group, a 2-ethylhexyl group, an isooctyl group, a isononyl group, an isodecyl group, a dodecyl group, a lauryl group, a tridecyl group, or the like.

(Styrene Block Segment)

The polymer which is the main component of the adhesive composition according to the present embodiment has a styrene block segment.

An adhesive composition whose main component is a polymer having a styrene block segment prevents generation of gas on an interface between the adhesive composition and an adhered object. Therefore, it is possible to obtain an adhesive composition which prevents stripping and the like of the adhesive composition caused by generation of gas on the interface at the time of heating and vacuuming, and which has an enhanced adhesive strength in a high temperature environment.

Moreover, dissociation between molecular chains of the adhesive composition in the high temperature environment is suppressed. Consequently, it is possible to prevent quality changes of the adhesive composition in the high temperature environment. Hence, the adhesive strength improves, and furthermore, stripping is easily carried out even after the adhesive composition has been subject to the high temperature process.

Further, even if an amount of a carboxylic acid used is slightly reduced, effects such as improvement of the thermal resistance are attained. Therefore, it is possible to further improve alkaline resistance of the adhesive composition which includes this polymer as its main component.

Hence, it is possible to further improve the thermal resistance, adhesive strength in a high temperature environment (particularly in a range of 140° C. to 200° C.), and easiness in stripping of the adhesive composition which has been subjected to the high temperature process.

The "styrene block segment" in the present specification is a part in which the styrene is copolymerized by units of blocks in the polymer. Addition of the styrene after polymerization has been initiated causes the styrene to be formed in a block unit just including the styrene. This is because, at this point, copolymerization of other components have mostly terminated. As such, the styrene block segment is a block copolymer obtained by polymerization of just the styrene that is added after initiation of polymerization of other monomer components.

The adhesive composition whose main component is a polymer having a styrene block segment is capable of preventing generation of gas on the interface between the adhesive composition and an adhered object. This allows an obtainment of an adhesive composition which prevents stripping and the like of the adhesive composition caused by the generation of gas on the interface at the time of heating and vacuuming, and which has improved adhesive strength in the high temperature environment.

Formation of the styrene block segment by the styrene is carried out by mixing all or part of the styrene to a copolymerization reacting system, that is, a reactor in which a copolymerization reaction is carried out, or the like. The copolymerization reaction is initiated by mixing a remaining part of the styrene, the (meth)acrylic acid ester and the alkyl (meth) acrylate. Subsequently, the all or part of the styrene is mixed to the copolymerization reacting system at once or stepwise, before the copolymerization reaction is terminated.

An amount of the styrene for forming the styrene block segment is adjusted by an amount of the styrene to be added after the copolymerization reaction has been initiated. This amount is appropriately set depending on an aimed property of the adhesive composition such as an aimed adhesive strength, thermal resistance or the like. However, the amount is preferably in a range of 5 to 80 parts by mass, and is further preferably in a range of 10 to 30 parts by mass, where an entire amount of the styrene to be used for producing the adhesive composition according to the present embodiment is 100 parts by mass.

The styrene to be added after the copolymerization reaction has been initiated is preferably added in a collective manner, that is, adding a whole amount of the styrene at once. Moreover, it is preferable to add the styrene during a first half of a time required for the copolymerization reaction. This allows formation of the styrene block segment in the adhesive composition in an appropriate manner, since the styrene copolymerizes closely together.

The "initiation of copolymerization reaction" in the present specification denotes a point of time when a copolymerization reaction initiates in the monomer composition mixed with compounds other than the compound to be mixed after the initiation of the copolymerization reaction.

The "initiation of copolymerization reaction" may be regarded as the following point of times in the following cases, respectively: the point of time when compounds that are to be mixed have terminated its mixing in a case where production of the adhesive composition is actually conducted; a point of time when stirring is started after at least a part of each of all compounds that are to be mixed are contained in the reactor in a case where a reactor provided with a stirrer is used for the copolymerization reaction; a point of time heating is started for reaching a reaction temperature in a case where a predetermined copolymerization reaction temperature is set; or a point of time when a polymerization initiator is added in a case the polymerization initiator is used.

The effect of the present invention is attainable regardless of which point of time is regarded as the "initiation of copolymerization reaction". Consequently, the "initiation of copolymerization reaction" may be set in accordance with production equipment, conditions and the like of the adhesive composition as appropriate, and control may be carried out to subsequent steps and the like.

In the present embodiment, "termination of the copolymerization reaction" denotes a point of time when a desired copolymerization reaction is attained. More specifically, the production of the adhesive composition is sufficiently carried out by regarding the "termination of the copolymerization reaction" as a point of time when the stirring is stopped, or a point of time when cooling of the reacting temperature is started.

(Carboxylic Acid Having Ethylenic Double Bond)

The monomer composition may further contain a carboxylic acid having an ethylenic double bond. The adhesive composition obtained by containing the carboxylic acid having the ethylenic double bond has an improved adhesive strength in a high temperature environment, particularly at a temperature in a range of 140° C. to 200° C., and further can easily be stripped off even after the adhesive composition has been subjected to a high temperature process. These effects are attained due to an improvement in polarity of the adhesive composition on an interface between the adhesive composition and an adhering surface on which the adhesive composition is applied, which results from an increase of a hydroxyl group (polar group) derived from the carboxylic acid in the adhesive composition. Further, these effects are also attained by suppression of dissociation between molecular chains in the adhesive composition which dissociation occur in the high temperature environment.

The carboxylic acid is not limited as long as the carboxylic acid has the ethylenic double bond and can be copolymerized with other monomer components, however is preferably a carboxylic acid which is represented by a general Formula (1) as follows:

[Formula 1]

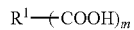

(1)

where $R^1$ denotes a C2 to C20 organic group having a (meth)acryloyl group or a vinyl group, and which may contain an oxygen atom; and m denotes an integer of 1 to 3. Further, the carboxylic acid is preferably a (meth)acrylic acid or a carboxylic acid represented by a general Formula (2) as follows:

[Formula 2]

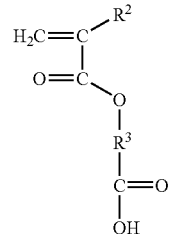

(2)

where $R^2$ denotes a hydrogen atom or a C1 to C4 alkyl group; and $R^3$ denotes a divalent C1 to C5 alkyl group or a divalent C4 to C20 organic group having a cyclic structure, which $R^2$ and $R^3$ may contain an oxygen atom. Specific examples of the carboxylic acid represented by the general Formula (2) encompass carboxylic acids where $R^3$ has a group in which two hydrogen atoms are removed from cyclohexane, norbornane, tricyclodecane, or tetracyclodecane. These carboxylic acids may be used solely, or two or more of the carboxylic acids may be used in combination. Among these carboxylic acids, the (meth)acrylic acid is more preferable. Copolymerization of these carboxylic acids with other components in the monomer composition progresses favorably, and further stabilizes a polymer structure obtained from the copolymerization. As a result, the dissociation between the molecular chains is prevented, which therefore improves the thermal resistance and the adhesive strength in the high temperature environment.

A mixed amount of the carboxylic acid is set as appropriate in accordance with an aimed property of the adhesive composition such as an aimed adhesive strength and the like, however is preferably in a range of 1 to 10 parts by mass and further preferably in a range of 1 to 5 parts by mass, where a total amount of the styrene, the (meth)acrylic acid ester and the alkyl (meth)acrylate is 100 parts by mass. The mixed amount of not less than 1 part by mass allows further improvement in the thermal resistance and the adhesive strength in the high temperature environment, of the obtained adhesive composition. The mixed amount of not more than 10 parts by mass suppresses moisture absorbency of the adhesive composition. This prevents gelling of the adhesive composition. Moreover, by reducing the amount of the carboxyl group included in the adhesive composition, the alkaline resistance also improves.

A timing for adding the carboxylic acid is not limited as long as the carboxylic acid can carry out copolymerization reaction with the components contained in the monomer composition other than the carboxylic acid.

That is to say, the carboxylic acid can be initially added to the monomer composition with the other components before the initiation of the copolymerization reaction. Alternatively, the carboxylic acid may be added between initiation of the copolymerization reaction of the other components and termination of such copolymerization reaction.

However, it is preferable to initiate the copolymerization reaction upon initially mixing the carboxylic acid with the styrene, (meth)acrylic acid ester and alkyl (meth)acrylate. By carrying out the copolymerization reaction of the monomer composition upon initial including of the carboxylic acid, random copolymerization of the carboxylic acid with the other components is possible. This enables the polar group to be uniformly present in the adhesive composition, which allows improvement in the polarity of the adhesive composition on the interface. The improvement in the polarity of the composition on the interface enables further suppression of the dissociation between the molecular chains in the adhesive composition, in the high temperature environment. As a result, the adhesive strength further improves.

(Bifunctional Monomer)

The monomer composition may further contain a bifunctional monomer. By containing the bifunctional monomer, constituent molecules of an obtained adhesive composition is cross-linked via the bifunctional monomer. A three-dimensional structure is generated due to the crosslinking, which causes an increase in mass-average molecular weight of the adhesive composition. It is generally known in the technical field of adhesives that the increase in the mass-average molecular weight of the constituent molecules improves, internal energy of the adhesive composition. It is also known that the internal energy is one cause of an obtained strength of the adhesive strength in the high temperature environment. Moreover, the increase in the mass-average molecular weight of the adhesive composition causes a rise in an apparent glass transition point. As a result of this, the adhesive strength improves. That is to say, by further containing the bifunctional monomer in the monomer composition, the mass-average molecular weight of the adhesive composition increases. This causes the adhesive strength in the high temperature environment to increase.

Further, by containing the bifunctional monomer in the monomer composition, it is possible to suppress occurrence of dissociation between molecular chains in the high temperature environment, which dissociation occurs within the adhesive composition. This causes an improvement in the adhesive strength at a high temperature, and even after the high temperature process is carried out to the adhesive composition, the adhesive composition can be easily stripped off. Moreover, an amount of the carboxylic group contained in the polymer is held low, which carboxylic acid is a cause of a decrease in alkaline resistance. As a result, the adhesive composition whose main component is this polymer has a high alkaline resistance.

Therefore, it is possible to provide an adhesive composition which has thermal resistance, alkaline resistance, high adhesive strength in a high temperature environment (particularly in a range of 140° C. to 200° C.), and which can be easily stripped off even after the adhesive composition has been subject to high temperature process.

The bifunctional monomer in the present specification denotes a compound which includes two functional groups. Namely, the bifunctional monomer is not limited as long as the bifunctional monomer is a compound which includes two functional groups. However, it is preferable for the bifunctional monomer to be at least one of a bifunctional monomer selected from a group consisting of compounds represented by a general Formula (3) as follows:

[Formula 3]

$$X^1—R^4—X^2 \qquad (3)$$

where $R^4$ denotes a divalent C2 to C20 alkyl group or a divalent C6 to C20 organic group having a cyclic structure, and which may contain an oxygen atom. $X^1$ and $X^2$ each independently denote a (meth)acryloyl group or a vinyl group. Examples of the compounds represented by the general Formula (3) encompass: dimethylol-tricyclodecane diacrylate, neopentyl glycol diacrylate, 1,9-nonanediol acrylate, naphthalene diacrylate, and compounds represented by Formula (4) as follows:

[Formula 4]

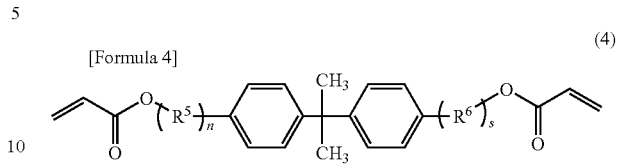

(4)

where $R^5$ and $R^6$ each independently denote ethylene oxide or propylene oxide; and n and s independently denote integers of 0 to 4, respectively. These compounds may be used solely, or two or more of the compounds may be used in combination.

Among these bifunctional monomers, it is further preferable for the bifunctional monomer to be at least one of a bifunctional monomer selected from the group consisting of dimethylol-tricyclodecane diacrylate, neopentyl glycol diacrylate, 1,9-nonanediol acrylate, naphthalene diacrylate, and the compounds represented by the Formula (4). These bifunctional monomers can readily be cross-linked with other monomer composition components, and crosslinking structures of such cross-linked bifunctional monomers are stable. Therefore, it is possible to obtain an adhesive composition which has a further improved adhesive strength in a high temperature environment and a further improved thermal resistance.

An amount of the bifunctional monomer is set as appropriate in accordance with an aimed property of the adhesive composition such as an aimed adhesive strength, however is preferably in a range of 0.1 to 0.5 parts by mass, and is further preferably in a range of 0.1 to 0.3 parts by mass, where a total amount of the styrene, the (meth)acrylic acid ester, and the alkyl (meth)acrylate is 100 parts by mass. The amount in the range of 0.1 to 0.5 parts by mass allows further improvement in the adhesive strength in a high temperature environment and in the thermal resistance of the adhesive composition thus obtained, and also allows suppression of moisture absorption. Hence, it is possible to prevent gelling of the adhesive composition.

The bifunctional monomer is most preferable to be initially mixed with the other monomer composition components before the initiation of the copolymerization reaction. However, a substantially same effect is attained even if a part or a whole amount of the bifunctional monomer is mixed after the copolymerization reaction of the other monomer composition components has been initiated.

(Styrene Macromonomer)

The monomer composition may further contain a styrene macromonomer. Containing of the styrene macromonomer allows an increase of a mass-average molecular weight of an obtained adhesive composition. Further, dissociation between molecular chains in the adhesive composition which occur in a high temperature environment is suppressed. Therefore, it is possible to further improve the thermal resistance, the adhesive strength in the high temperature environment (particularly in a range of 140° C. to 200° C.), and the easiness of stripping following a high temperature process, of the adhesive composition. Moreover, a contained amount of the carboxylic acid which causes the alkaline resistance to decrease is suppressed low in the polymer. This allows the adhesive composition whose main component is the polymer to have a high alkaline resistance.

The styrene macromonomer is not limited as long as (i) a styrene block structure is included in the structure of the styrene macromonomer, and (ii) the styrene macromonomer can be copolymerized with other components of the monomer composition. However, it is preferable for the styrene macromonomer to have a styrene block structure and include organic groups positioned on both edges of the styrene block structure, which at least one of the organic groups has a carbon-carbon double bond. The styrene macromonomer is further preferable to be a styrene macromonomer represented by Formula (5) as follows:

[Formula 5]

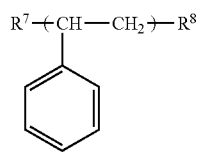

$$R^7-(CH-CH_2)-R^8 \quad (5)$$

where $R^7$ and $R^8$ each independently denote a C1 to C10 organic group having at least one carbon-carbon double bond, and which may contain an oxygen atom.

The number of styrene which form the styrene block structure in the styrene macromonomer is not particularly limited, and is set as appropriate in accordance with an aimed property of the adhesive composition such as an aimed adhesive strength, thermal resistance or the like, however is preferably a number in a range of 20 to 100, and is further preferably a number in a range of 50 to 70.

Specific examples of the styrene macromonomer encompass: macromonomer (grade: AS-6S, produced by Toagosei Co., Ltd.) and macromonomer (grade AN-6S, produced by Toagosei Co., Ltd.). These styrene macromonomers may be used solely, or two or more styrene macromonomers may be used in combination. Copolymerization of these styrene macromonomers with the other components of the monomer composition progress favorably, and further stabilizes a polymer structure obtained due to the copolymerization. Hence, dissociation between molecular chains is prevented. As a result, the thermal resistance and the adhesive strength in the high temperature environment are improved.

An amount of the styrene macromonomer is set as appropriate in accordance with the aimed property of the adhesive composition such as the aimed adhesive strength, thermal resistance or the like, however a total amount of the styrene and the styrene macromonomer is to be in a range of 30 to 90 parts by mass, and is preferably in a range of 40 to 60 parts by mass, where the total amount of the monomer composition is 100 parts by mass. The amount of the styrene macromonomer is preferably in a range of 5 to 40 parts by mass within the range of the total amount of the styrene and the styrene macromonomer, and is further preferably in a range of 10 to 20 parts by mass within the range of the total amount of the styrene and the styrene macromonomer, which range of the total amount of the styrene and the styrene macromonomer is in a range of 30 to 90 parts by mass. The amount in this range allows the adhesive composition to contain the styrene and the styrene macromonomer in a suitable proportion. That is to say, the adhesive composition can attain both the effect of improvement in the thermal resistance due to the styrene and the effect of improvement in the adhesive strength in the high temperature environment due to the styrene macromonomer.

A timing to mix the styrene macromonomer is not limited as long as the styrene macromonomer can carry out copolymerization reaction with components of the monomer composition other than the styrene macromonomer.

That is to say, the styrene macromonomer may be initially mixed to the monomer composition before the copolymerization reaction is initiated, or may be mixed between initiation of the copolymerization reaction of the other components and termination of such copolymerization reaction. It is preferable to mix the styrene macromonomer at a timing after the copolymerization reaction of the components of the monomer composition other than the styrene macromonomer has been initiated, and is further preferable to mix the styrene macromonomer at once or stepwise, after the copolymerization reaction has been initiated. Such way of mixing allows uneven distribution of places in the adhesive composition at which a styrene block structure derived from the styrene macromonomer is aggregated. This further suppresses the dissociation of the molecular chains which occur in the high temperature environment, which as a result, improves the adhesive strength in the high temperature environment.

(Components other than Main Component in Adhesive Composition)

The adhesive composition according to the present embodiment may contain acrylamide such as dimethyl acrylamide and morpholine such as acryloylmorpholine, as an other additive component. Containing of such additive component allows concurrent improvement of the thermal resistance and adhesiveness.

The adhesive composition according to the present embodiment may further include, in an extent in which essential properties of the present invention is not lost, miscible additives for example a commonly used addition resin, plasticizing agent, adhesive auxiliary agent, stabilization agent, coloring agent, and surface active agent, each of which improves effectiveness of the adhesive.

Further, the adhesive composition may be diluted by use of an organic solvent for adjusting viscosity of the adhesive composition, in the extent in which the essential properties of the present invention is not lost. Examples of the organic solvent encompass: ketones such as acetone, methyl ethyl ketone, cyclohexanone, methyl isoamyl ketone, or 2-heptanone; polyhydric alcohols and derivatives thereof such as monomethyl ethers, monoethyl ethers, monopropyl ethers, monobutyl ethers, or monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate; cyclic ethers such as dioxane; or esters such as methyl lactate, ethyl lactate, methyl acetate, ethyl acetate, butyl acetate, methyl pyruvate, ethyl pyruvate, methyl methoxy propionate, or ethyl methoxy propionate. These organic solvents may be used solely, or two or more of the organic solvents may be used in combination. Particularly, it is preferable to use the polyhydric alcohols and derivatives thereof such as the monomethyl ethers, monoethyl ethers, monopropyl ethers, monobutyl ethers, or monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate.

An amount of the organic solvent used is set as appropriate in accordance with a film thickness of the adhesive composition to be applied, and is not particularly limited as long as the adhesive composition is in a concentration which is applicable to a supporting body such as a semiconductor wafer or the like. Generally, the adhesive composition is used so that a solid content concentration is in a range of 20 mass % to 70 mass %, and preferably in a range of 25 mass % to 60 mass %.

The above description explains components of the monomer composition, a favorable structure of a polymer obtained by copolymerizing the components, and the like, as the adhesive composition for solving the problems of the foregoing conventional adhesives. These components, structure, and the like can be combined as appropriate; needless to say, a combination of these components and the structure demonstrate an effect in accordance with further high thermal resistance and alkaline resistance, easiness in stripping, and reduction of an amount of gas generated when heating or vacuuming.

[Copolymerization Reaction]

Copolymerization reaction of the monomer composition is to be carried out in a conventionally known method, and is not particularly limited in what method is used. For example, an adhesive composition according to the present invention is attainable by stirring the monomer composition by use of an existing stirring device.

A temperature condition of the copolymerization reaction is not limited and may be set as appropriate, however is preferably in a range of 60° C. to 150° C., and is further preferably in a range of 70° C. to 120° C.

Moreover, a solvent may be used as appropriate in the copolymerization reaction. The aforementioned organic solvents may be used as the solvent; propylene glycol monomethyl ether acetate (hereinafter referred to as PGMEA) is preferable among the solvents.

In the copolymerization reaction according to the present embodiment, a polymerization initiator may be used as appropriate. Examples of the polymerization initiator encompass: azo compounds such as 2,2'-azobisisobutylonitrile, 2,2'-azobis(2-methylbutylonitrile), dimethyl 2,2'-azobis isobutyrate, 1,1'-azobis(cyclohexane-1-carbonitrile), and 4,4'-azobis(4-cyanovaleric acid); and organic peroxides such as decanoyl peroxide, lauroyl peroxide, benzoyl peroxide, bis (3,5,5-trimethyl hexanoyl) peroxide, succinic acid peroxide, tert-butyl peroxy-2-ethylhexanoate, tert-butyl peroxypivalate, and 1,1,3,3-tetramethylbutylperoxy-2-ethylhexanoate. These polymerization initiators may be used solely, or two or more of the polymerization initiators may be used in combination as appropriate. An amount of the polymerization initiator to be used may be set as appropriate in accordance with a combination of the monomer composition, reaction conditions, and the like, and is not particularly limited.

[Film Adhesive]

The adhesive composition according to the present invention as described above may be used in various ways depending on its purpose. For example, the adhesive composition in a liquid form may be applied on a processed body such as a semiconductor wafer so as to form an adhesive layer. Alternatively, a film adhesive according to the present invention, that is, a film such as a flexible film on which an adhesive layer containing any one of the foregoing adhesive compositions is formed in advance and dried, may be used by attaching this film (film adhesive) to the processed body (film adhesive method).

As such, the film adhesive according to the present invention includes a film, and an adhesive layer on which any one of the aforementioned adhesive compositions is contained.

Since the polymer which is a main component of the adhesive layer has a styrene block segment, it is possible to prevent generation of gas on the interface between the adhesive composition and the adhering surface on which the adhesive composition is to be applied. Hence, a film adhesive is obtained which has a high thermal resistance, a high alkaline resistance and a high adhesive strength in a high temperature environment, and which further can be easily stripped off even after the film adhesive has been subjected to a high temperature process.

In a case where the monomer composition further contains the carboxylic acid, a polar group is to be introduced to the adhesive layer. Moreover, in a case where the monomer composition further contains the bifunctional monomer, molecules which form the adhesive layer are cross-linked by the bifunctional monomer.

Moreover, in a case where the monomer composition further contains the styrene macromonomer, the adhesive composition which forms the adhesive layer increases in average molecular weight. Such adhesive layer has a styrene block structure derived from the styrene macromonomer. Thus, the dissociation between the molecular chains in the adhesive composition which occur in the high temperature environment is suppressed.

Hence, it is possible to obtain a film adhesive which has a further high thermal resistance, adhesive strength in a high temperature environment, and alkaline resistance, and which excels in easiness of stripping.

The film adhesive may be used by further covering a protection film on the adhesive layer. In this case, the adhesive layer is easily provided on the processed body by (i) stripping off the protection film which covers the adhesive layer; (ii) placing, on the processed body, the adhesive layer thus exposed, and (iii) stripping the film off from the adhesive layer.

Consequently, use of the film adhesive allows formation of a layer having even thickness and a good surface smoothness as compared to a case where the adhesive composition is directly applied on the processed body so as to form the adhesive layer.

The film to be used in production of the film adhesive is not limited, as long as an adhesive layer formed on the film is strippable from the film, and is a release film which can transfer the adhesive layer to a processed surface such as a protection board or a wafer. An example of the film is a flexible film made of synthetic resin film such as polyethylene terephthalate, polyethylene, polypropylene, polycarbonate or polyvinyl chloride, each in a thickness in a range of 15 μm to 125 μm. It is preferable for the film to be strip processed if necessary so that transfer can be readily carried out.

A well known method is to be used as a method for forming the adhesive layer on the film as appropriate, in accordance with a desired thickness and evenness of the adhesive layer, and is not particularly limited in what method is used. For example, a method may be used in which the adhesive composition according to the present invention is applied on a film by use of an applicator, a bar coater, a wire bar coater, a roll coater, or a curtain flow coater, so that a dried thickness of the adhesive layer is in a range of 10 μm to 1000 μm. Among the coaters, the roll coater is preferable since the roll coater excels in evenness of the film thickness, and is capable of efficiently forming a thick film.

In a case where the protection film is to be used, the protection film to be used is not limited as long as the film is strippable from the adhesive layer. However, it is preferable for the protection film to be, for example, polyethylene terephthalate film, polypropylene film, or polyethylene film. Moreover, each of the protective films are preferably coated with silicon or preferably baked. This allows an easier stripping off from the adhesive layer. A thickness of the protection film is not particularly limited, however is preferably in a range of 15 μm to 125 μm. This is because the adhesive film attached with the protective film can secure flexibility of the film adhesive.

A method for using the film adhesive is not particularly limited. For example, the following method may be taken in a case where the protection film is used: the protection film is stripped off from the film adhesive, the adhesive layer thus exposed is placed on the processed body, and a heating roller is rolled on the film (back surface of the surface on which the adhesive layer is formed), so that the adhesive layer is thermally compressed onto the surface of the processed body. At this time, by sequentially rolling up the protection film on a reel roller or the like, the protection film that is stripped off from the film adhesive may be stored and reused.

The adhesive composition of the present embodiment is not particularly limited as long as the adhesive composition is used for adhering purposes, however the adhesive composition is suitably used as an adhesive composition for adhering a high-precision processing protection board of a semiconductor wafer to a substrate such as a semiconductor wafer. The adhesive composition of the present invention is particularly suitably used as an adhesive composition, when a substrate such as the semiconductor wafer is grinded so that a thickness of the substrate is reduced, for attaching the substrate to a support plate (e.g., Japanese Unexamined Patent Publication, No. 191550/2005 (Tokukai 2005-191550)).

[Stripping Solution]

A commonly used stripping solution may be used as a stripping solution for removing the adhesive composition according to the present embodiment, however from a point of environmental burden and stripping properties, a stripping solution whose main component is PGMEA, ethyl acetate, or methyl ethyl ketone is preferably used.

EXAMPLES

The following description explains Examples which demonstrate adhesive strength and the like of an adhesive composition according to the present invention.

Note that evaluations of adhesive compositions of the following Example and Comparative Example were carried out by measuring, for each of the adhesive compositions, (i) thermal resistance, (ii) moisture absorbency, (iii) flexibility, (iv) adhesive strength in different temperature conditions, and (v) an amount of gas generated (hereinafter referred to as "generated gas") at a temperature of 200° C. Measuring methods of each of the items are explained below.

(Method for Measuring Thermal Resistance, Moisture Absorbency, and Generated Gas)

After applying the adhesive compositions according to Example and Comparative Example later described on silicon wafers, respectively, each of applied films were heated from 40° C. to 250° C. A degassing amount from each of the applied films was measured, and evaluation was made from the amount of gas measured.

Reasons why evaluation of thermal resistance and moisture absorbency is possible from the degassing amount is as follows. That is, the degassing amount measured until a temperature of 100° C., is an amount of gas derived from either water vapor or its azeotropic gas. The water vapor or the azeotropic gas is derived from moisture absorbed by the adhesive composition. Thus, it is possible to evaluate the moisture absorbency from the degassing amount measured until the temperature reaches 100° C. The degassing amount measured at a temperature not less than 100° C. is an amount derived from gas that has generated due to decomposition of the adhesive composition caused by heat. Therefore, the thermal resistance can be evaluated from the degassing amount at a temperature of not less than 100° C., particularly around 200° C.

A TDS method (Thermal Desorption Soectroscopy method) was used for measuring the degassing amount. EMD-WA1000, manufactured by ESCO, Ltd. was used as a TDS measuring device (discharged gas measuring device).

A measuring condition of the TDS device was set as Width: 100; Center Mass Number: 50; Gain: 9; Scan Speed: 4; and Emult Volt: 1.3 KV.

The thermal resistance was evaluated at a temperature of 200° C. by definitions as follows: "G (good)" indicates a case where a strength (Indensity) required by the TDS measuring device was not more than 100000, and no residue was observed by a metallurgical microscope; "S (sufficient)" indicates a case where the Indensity was not less than 100000, however no residue was observed by the metallurgical microscope; and "P (poor)" indicates in a case where the Indensity was not less than 100000 and residue was observed by the metallurgical microscope.

The moisture absorbency was evaluated at a temperature of 100° C. by definitions as follows: "G" in a case where the Indensity is not more than 10000; and "P" in a case where the Indensity is not less than 10000.

The generated gas was evaluated at a temperature of 200° C. by definitions as follows: "G" in a case where the strength (Indensity) required by the TDS measuring device was not more than 100000; and "P" in a case where the Indensity was not less than 100000.

(Adhesive Strength at Various Temperatures)

After application of the adhesive compositions according to Example and Comparative Example on silicon wafers, respectively, the adhesive compositions were dried for three minutes at a temperature of 150° C. Next, a glass substrate was adhered to each of the adhesive compositions at a temperature of 200° C. and with a load of 1 kg. Thereafter, the glass substrates were pulled, and adhesive strengths at a time when each of the glass substrates were stripped off from the respective silicon wafer were found by use of a vertical model motorized stand "MX-500N" (manufactured by IMADA CO., LTD.).

(Evaluation of Flexibility)

After the adhesive compositions were applied on 6-inch silicon wafers, respectively, by use of a spinner at a speed of 1000 rpm for 25 seconds, each of the adhesive compositions were heated on a hotplate at a temperature of 200° C. for three minutes. This obtained a coated film layer on the silicon wafers. Subsequently, whether or not cracks exist on the coated film layers were observed; a coated film layer that had a crack was evaluated as "P", and a coated film layer that did not have a crack was evaluated as "G". Note that the silicon wafers that were used had a thickness of 15 µm.

(Evaluation of Alkaline Resistance)

The alkaline resistance was evaluated as follows. After the adhesive compositions according to Example and Comparative example were applied on the silicon wafers, respectively, the adhesive compositions applied were dried at a temperature of 200° C. for three minutes. Next, these dried adhesive compositions were immersed in a 2.38 mass % TMAH (tetramethyl ammonium hydroxide) aqueous solution. Subsequently, it was observed by visual inspection whether or not the applied films melted. If the melting of the applied film was not observed, the adhesive composition was evaluated as "G"; if the melting was observed, the adhesive composition was evaluated as "P".

Example 1

Properties of Example 1 and Comparative Example 1 were compared. Example 1 is an adhesive composition whose main component is a polymer in which a styrene block segment is formed by mixing a part of styrene at once in a flask after initiation of copolymerization reaction. Comparative Example 1 is an adhesive composition which does not have the styrene block segment.

Table 1 shows components of a monomer composition and an average molecular weight of an attained adhesive composition, for each of Example 1 and Comparative Example 1.

TABLE 1

| Component (parts by mass) | Example 1 | Comparative Example 1 |
|---|---|---|
| Methyl methacrylate | 15 | 15 |
| n-butyl methacrylate | 13 | 13 |
| Styrene (initially mixed) | 32 | 52 |
| Styrene (mixed after initiation of synthesis reaction) | 20 | 0 |
| Phenoxyethyl acrylate | 20 | 20 |

The adhesive composition according to Example 1 was obtained as follows:

In a four-neck flask having a capacity of 300 ml, provided with a reflux condenser, a stirrer, a thermometer, and a nitrogen inlet tube, 90 g of PGMEA was added as a solvent, and 20 g of phenoxyethyl acrylate, 15 g of methyl methacrylate, 13 g of n-butyl methacrylate, and 32 g of styrene were added as a monomer in the PGMEA as shown in Table 1. Subsequently, blowing in of $N_2$ was started. Polymerization was initiated by stirring the mixture, and the mixture was heated to 90° C. while stirred. Subsequently, a compound liquid containing 13.3 g of PGMEA and 20 g of styrene, and a compound liquid containing 13.33 g of PGMEA and 0.6 g of tert-butyl peroxy-2-ethylhexanoate as a polymerization initiator, were each continuously dropped over 2 hours, from different nozzles at a constant dropping rate.

The polymerization reaction liquid obtained after completion of the dropping was aged for one hour at a temperature of 90° C. Thereafter, a compound liquid containing 83.34 g of PGMEA and 0.3 g of tert-butyl peroxy-2-ethylhexanoate was dropped over one hour. Subsequently, after the polymerization reaction liquid was further aged for one hour at a temperature of 90° C., 1.0 g of 1,1,3,3-tetramethylbutylperoxy-2-ethylhexanoate was poured into the polymerization reaction liquid at once.

The polymerization reaction liquid was further aged for three hours at a temperature of 90° C. After the polymerization liquid was heated until a reflux of the solvent was observed, the polymerization reaction liquid was aged for one hour. After this, the polymerization was terminated.

The adhesive composition according to Comparative Example 1 was obtained as follows.

In a four-neck flask having a capacity of 300 ml, provided with a reflux condenser, a stirrer, a thermometer, and a nitrogen inlet tube, 53.85 g of PGMEA was added as a solvent, and 20 g of phenoxyethyl acrylate, 15 g of methyl methacrylate, 13 g of n-butyl methacrylate, and 52 g of styrene were added as a monomer in the PGMEA as shown in Table 1. Subsequently, blowing in of $N_2$ was started. Polymerization was initiated by stirring the mixture, and the mixture was heated to 90° C. while stirred. Subsequently, a compound liquid containing 38.45 g of PGMEA and 1.0 g of tert-butyl peroxy-2-ethylhexanoate as a polymerization initiator was continuously dropped from a dropping nozzle over two hours at a constant dropping rate.

A polymerization reaction liquid obtained after the dropping was aged at a temperature of 90° C. for one hour. Thereafter, a compound liquid of 25.10 g of PGMEA and 0.3 g of tert-butyl peroxy-2-ethylhexanoate were dropped to the polymerization reaction liquid over one hour. Subsequently, the polymerization reaction liquid was further aged for one hour at a temperature of 90° C., and then 1.0 g of 1,1,3,3-tetramethylbutylperoxy-2-ethylhexanoate was poured into the polymerization reaction liquid at once.

Next, the polymerization reaction liquid was aged for three hours at a temperature of 90° C., and then was heated until reflux of the solvent was recognized. Thereafter, the polymerization reaction liquid was aged for one hour. After this, the polymerization was terminated.

As such, Comparative Example 1 initiated copolymerization reaction after all of the monomer compositions were initially mixed. On contrary, Example 1 mixed, in the flask, 20 parts by mass of the styrene among the 52 parts by mass of the styrene to be used, after mixing a remaining styrene (32 parts by mass) with the other components of the monomer composition, starting the blowing in of $N_2$, and heating the mixture to a temperature of 90° C.

The generated gas, thermal resistance, flexibility, moisture absorbency, and alkaline resistance were compared between Example 1 and Comparative Example 2. A comparison result is as shown in Table 2.

TABLE 2

| Evaluation Result | Example 1 | Comparative Example 1 |
|---|---|---|
| Generated Gas | G | P |
| Thermal Resistance | G | G |
| Flexibility | G | G |
| Moisture Absorbency | G | G |
| Alkaline Resistance | G | G |

Figure 2:
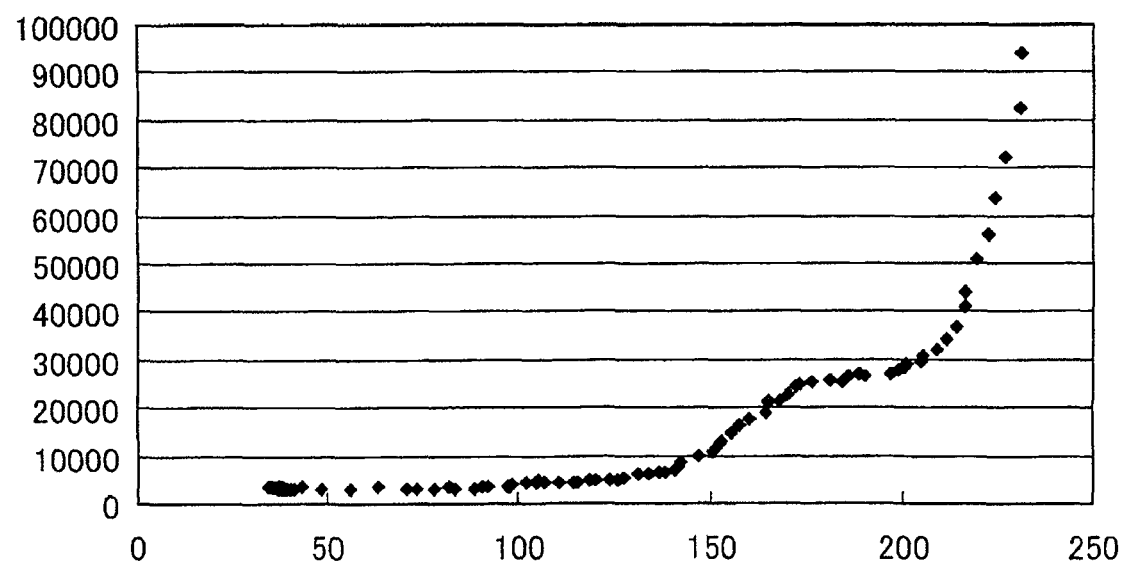
FIG. 2 is an explanatory view showing a result of a TDS measurement of an adhesive composition according to Comparative Example.

A TDS measurement result of Example 1 is shown in FIG. 1 and the TDS measurement result of Comparative Example 1 is shown in FIG. 2. In FIGS. 1 and 2, the horizontal axis represents temperature (° C.), and the vertical axis represent strength (Indensity) obtained in the TDS measurement.

Figure 3:
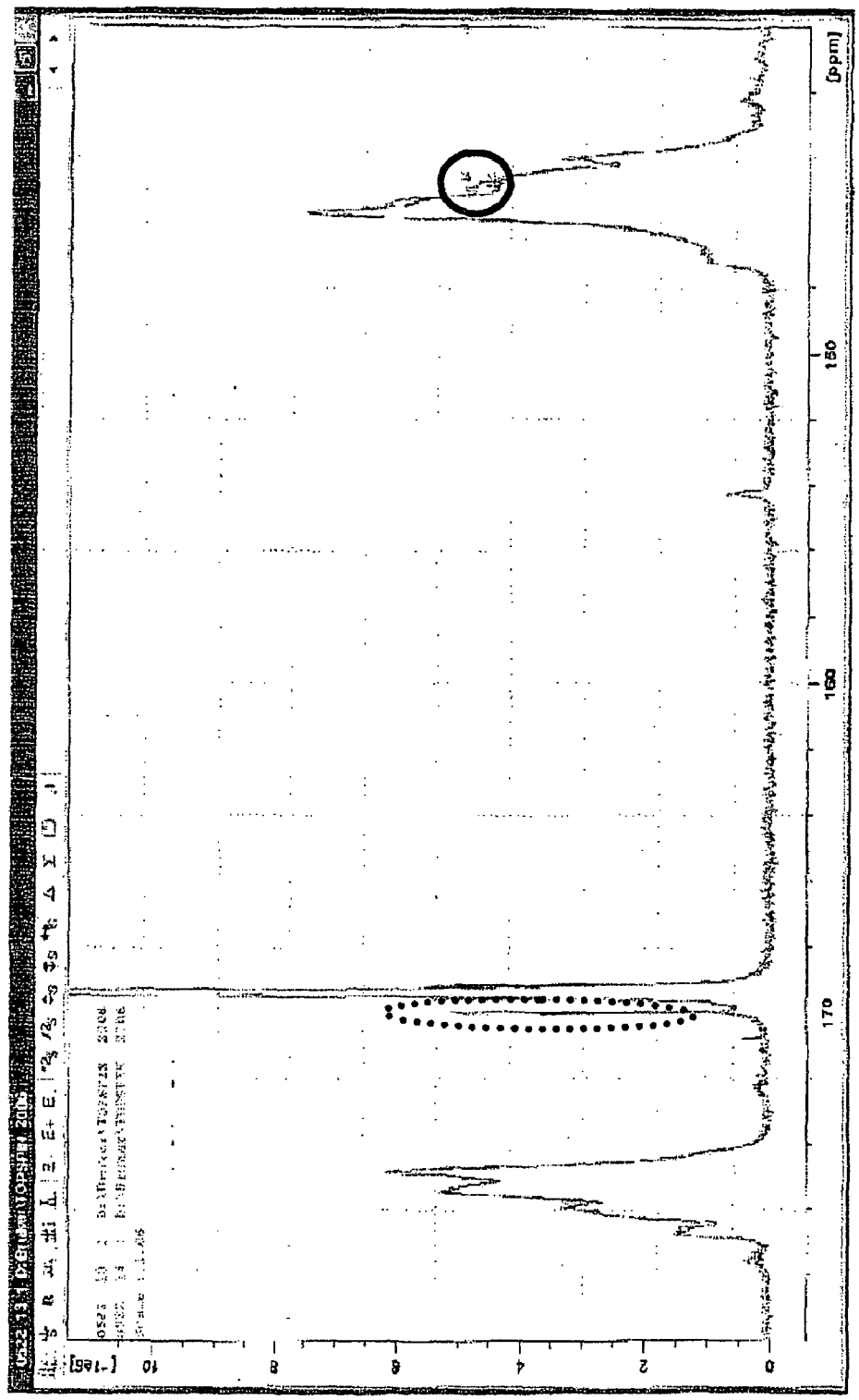
FIG. 3 is an explanatory view showing a comparison result of an obtained spectrum by carrying out NMR spectrum measurement to (i) an adhesive composition whose main component is a polymer that has a styrene block segment and (ii) an adhesive composition according to Comparative Example.

A result of comparing an obtained spectrum by measuring Example 1 and Comparative Example 2 in an NMR (nuclear magnetic resonance) spectrum is shown in FIG. 3.

In FIG. 3, a peak shown by the broken line circle is a peak recognized only in Comparative Example 1; a peak shown by the solid line circle is a peak recognized only in Example 1. Consequently, it was verified that the polymer structure differs depending on whether or not a styrene block is included.

As described above, an adhesive composition according to the present invention is an adhesive composition whose main component is a polymer obtained by copolymerizing a monomer composition, the monomer composition containing styrene, a (meth)acrylic acid ester having a cyclic structure, and an alkyl (meth)acrylate having a chain structure, the polymer having a styrene block segment. Hence, dissociation between molecular chains in the adhesive composition that occur in a high temperature environment is suppressed. Further, it is possible to prevent generation of gas on an interface between the adhesive composition and an adhering surface on which the adhesive composition is to be applied. This allows prevention of stripping off of adhesive due to the generation of gas on the interface, which as a result allows improvement in adhesive strength at a high temperature. Moreover, an amount of a carboxylic group contained in the polymer is suppressed low, which carboxylic group is a cause of decrease in alkaline resistance. Thus, the adhesive composition which contains this polymer as its main component has a high alkaline resistance.

Therefore, an effect is attained such that an adhesive composition is provided, which has a high thermal resistance, high adhesive strength in a high temperature environment (particularly at a temperature in a range of 140° C. to 200° C.), and high alkaline resistance, and which can be easily stripped off even after the adhesive component has been subjected to a high temperature process.

As described above, a film adhesive according to the present invention includes a film; and an adhesive layer provided on the film, containing the adhesive composition.

Consequently, the polymer, which is the main component of the adhesive layer, is capable of preventing generation of gas on an interface between the adhesive composition and an adhering surface on which the adhesive composition is applied, by including the styrene block segment.

Hence, it is possible to obtain a film adhesive which has a high thermal resistance, high adhesive strength in a high temperature environment, and high alkaline resistance, and which can be easily stripped off even after the film adhesive has been subjected to a high temperature process.

As described above, a process of producing an adhesive composition according to the present invention includes: introducing the styrene in a range of 5 to 100 parts by mass at once or stepwise, between initiation and termination of the copolymerization, wherein an entire amount of the styrene is 100 parts by mass, and the copolymerization is initiated by mixing the (meth)acrylic acid ester, the alkyl (meth)acrylate, and a remaining part of the styrene. This thus allows providing of a film adhesive that has a high adhesive strength in a high temperature environment. Moreover, after components of the monomer composition other than the styrene that is introduced after the initiation of the copolymerization has polymerized to a certain degree, the styrene polymerizes to an end of a polymerized molecular chain so as to form a styrene block segment. Thus, the effect of preventing the generation of gas is further improved. In addition, the amount of the carboxyl group contained can be suppressed low, which carboxyl group is a cause of decrease in the alkaline resistance.

Therefore, an effect is attained in any one of the foregoing processes for production such that an adhesive composition is provided, which has high thermal resistance, high adhesive strength in a high temperature environment (particularly in a range of 140° C. to 200° C.), and an alkaline resistance, and which can be easily stripped off even after the adhesive composition has been subjected to a high temperature process.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An adhesive composition and a film adhesive according to the present invention has high thermal resistance, high alkaline resistance, and low moisture absorbency, generates few gas when heated, and can be easily stripped off by use of a stripping solution. Hence, the adhesive composition and the film adhesive according to the present invention is suitably used in a step of processing a semiconductor wafer or chip, which step carries out a high temperature process, a high vacuum process, and a process which uses various chemicals such as alkaline.

The invention claimed is:

1. A process of producing an adhesive composition whose main component is a polymer obtained by copolymerizing a monomer composition containing styrene, a (meth)acrylic acid ester having a cyclic structure, and an alkyl (meth)acrylate having a chain structure, the process comprising:
    introducing the styrene in a range of 5 to 100 parts by mass at once or stepwise, between initiation and termination of the copolymerization, wherein an entire amount of the styrene is 100 parts by mass, and the copolymerization is initiated by mixing the (meth)acrylic acid ester, the alkyl (meth)acrylate, and a remaining part of the styrene.

* * * * *